United States Patent

Green et al.

[11] Patent Number: 5,877,882
[45] Date of Patent: *Mar. 2, 1999

[54] OPTICAL DOCKING STATION

[75] Inventors: William F. Green, Vestal, N.Y.;
Vincent M. Lisica, Raleigh, N.C.;
Donald L. Pearl, Endwell, N.Y.

[73] Assignee: International Business Machines Corp., Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 663,339

[22] Filed: Jun. 13, 1996

[51] Int. Cl.⁶ ............................ H04B 10/10; H04B 10/24
[52] U.S. Cl. ......................... 359/163; 359/143; 359/159; 359/171
[58] Field of Search ................................. 359/143, 144, 359/159, 163, 171, 145, 152, 172

[56] References Cited

U.S. PATENT DOCUMENTS

| | | | |
|---|---|---|---|
| 4,377,843 | 3/1983 | Garringer et al. | 364/200 |
| 4,751,582 | 6/1988 | Koseki et al. | 359/159 |
| 4,814,742 | 3/1989 | Morita et al. | 359/163 |
| 4,870,637 | 9/1989 | Follett et al. | 370/4 |
| 4,908,823 | 3/1990 | Haagens et al. | 359/163 |
| 5,049,863 | 9/1991 | Oka | 340/710 |
| 5,184,314 | 2/1993 | Kelley et al. | 364/709 |
| 5,307,297 | 4/1994 | Iguchi et al. | 364/708.1 |
| 5,343,319 | 8/1994 | Moore | 359/145 |
| 5,387,994 | 2/1995 | McCormack et al. | 359/172 |
| 5,519,527 | 5/1996 | Panton | 359/163 |
| 5,600,471 | 2/1997 | Hirohashi et al. | 359/152 |
| 5,668,977 | 9/1997 | Swanstrom et al. | 395/500 |

OTHER PUBLICATIONS

PCMCIA PC Card Standard–Release 2.0 p. 2–2, Sep. 1991.
"Docking Station Communication Link," *IBM Technical Disclosure Bulletin*, vol. 37, No. 02A, Feb. 1994, pp. 335–337.

*Primary Examiner*—Leslie Pascal
*Attorney, Agent, or Firm*—Scully, Scott, Murphy & Presser; Lawrence R. Fraley

[57] ABSTRACT

An optical connection means is provided for connecting an optical docking station to an information handling system and to one or more peripheral devices. The optical connection means comprises two components that are not mechanically attached. The two components are a laptop component that is housed within the information handling system and within the one or more peripheral devices, and a docking station component housed within the optical docking station. The components send and receive information optically (i.e., in the form of light) to each other.

9 Claims, 5 Drawing Sheets

OPTICAL DOCKING STATION

FIELD OF THE INVENTION

The present invention relates to docking stations used to connect a portable information handling system to peripheral devices such as a printer, external hard drive, alternate key board or video display means. More particularly, the invention relates to a docking station that uses an optical connection means rather than an electrical connection means between the portable information handling system and the peripherals.

BACKGROUND OF THE INVENTION

A docking station is a device that is used to connect a portable information handling system to peripheral devices. The peripheral devices include but are not limited to printers, external hard drives, alternate keyboards, video display means (i.e. monitors), and modems. In the typical docking station, the connection means between the portable information handling system and the peripherals is electrical.

The docking station itself is primarily a convenience tool because the peripherals are normally permanently connected to the docking station and the portable information handling system is then removably connected to the docking station. This arrangement avoids the need to plug in several peripherals by consolidating all the interfaces through one connector: the docking station. The docking station, as the single connection point between the portable information handling system and the peripherals, is often very large just to accommodate all the peripheral device types. The larger and more versatile the docking station becomes, the more difficult the connection becomes. The connector between the portable information handling system and the docking station is likely to be in the range of 150 to 300 pins wide. Such a sizable connection has become a problem with users of the portable information handling system for two reasons. One, the large connection requires considerable force to connect and disconnect from the docking station. Two, the connector can be easily damaged by misalignment and repeated use, thus damage to the connector frequently results and is serious because of the large number of pins involved. The connector is expensive to replace due to labor costs. Moreover, damage to the connector could require a replacement of the main electronics board of the laptop computer due to the difficulty of the repair of the connector. The connector itself also is expensive to replace.

In addition, the connector creates burdens in the design of small portable information handling systems. The connector requires that a large flat area be provided on the case of the portable information handling system to accommodate the connector. This impacts the design of the portable information handling system and conflicts with the rounded contours preferred by users of the portable information handling system. Typically each portable information handling system manufacturer designs its own docking station, and neither docking stations nor connectors are compatible with portable information handling systems made by different manufacturers.

Existing docking stations are simply a box with all the necessary connectors and one central connector that interfaces with the portable. The more costly docking stations also contain features for plugging in electronic circuit package cards for personalized expansion of the docking station and/or peripheral features beyond those offered by the portable information handling system itself. These more costly docking stations function by providing bus extension between the portable information handling system and the docking station. That is, the docking stations bring out the portable information handling system's bus via the large connector or provide access to the micro-channel interface. Even the more costly docking stations are still by definition "dumb" devices in that they do not contain any processing capability.

SUMMARY OF THE INVENTION

It is an object of the invention to provide a means for connecting a portable information handling system to peripheral devices by a connection means that is easy to use.

It is a further object of the invention to provide a means for connecting a portable information handling system to peripheral devices by a connection means that is not difficult or expensive to repair and that does not require frequent repair.

It is a further object of the invention to provide a means for connecting a portable information handling system to peripheral devices by a connection means that permits rounded contours on the casing of the portable information handling system.

Accordingly, an optical connection means is provided for connecting an optical docking station to an information handling system and to one or more peripheral devices. The optical connection means comprises two components that are not mechanically attached. The two components are a laptop component that is housed within the information handling system and within the one or more peripheral devices, and a docking station component housed within the optical docking station. The components send and receive information optically (i.e., in the form of light) to each other.

The advantages of the invention are many, including that the optical connection means provided does not wear out, is easy to use, does not require force on the part of the user, and permits rounded contours on the casing of the portable information handling system. A further advantage of the invention is that the connection means provided is adaptable to portable information handling systems and peripherals manufactured by any manufacturer.

Other features and advantages of the invention will be apparent from the following detailed description of the invention and the accompanying drawings.

DETAILED DESCRIPTION OF THE INVENTION

A high speed, short distance, optical interface can provide the required connectivity between a portable information handling system and a docking station thus providing a "connector-less" interface between each unit. Peripheral devices also can be connected to a docking station using an optical interface as the connection means. The required data for a peripheral device can be serialized and transported from the portable information handling system to the mating docking unit where the data could then be deserialized and reinterfaced to the desired peripheral. Only the necessary information need be transported over this interface. That is, bus extension would not be practical nor desirable. Bus extension would require very high band width and consequently costly optical components or a custom compression chip for each bus type. As an alternative to bus extension, a microprocessor is used within the docking station to recreate the bus signals and control the optical link interfacing between the portable information handling system and the docking station.

The apparent disadvantage of needing additional support hardware, in the form of a microprocessor within the docking station, actually provides a means to exploit several unique advantages of using a microprocessor within the docking station. This kind of configuration allows the docking station to become a "smart dock". That is, independent remote job capability will exist within the docking station. The docking station can be given assignments by the host portable information handling system to be carried out in the absence of the controlling portable information handling system.

The speed of the peripherals that are interfaced to the docking station must be compatible with the docking station, not necessarily with the host portable information handling system. Data can be sent in either direction (i.e., from portable information handling system to peripheral, or vice versa, through the docking station) and care must be taken to insure that data will not be lost should a speed difference exist between the host portable information handling system and the docking station for burst mode transfers. This makes the docking station universal in terms of interfacing with portable information handling systems or peripherals made by any manufacturer. Any portable information handling system that is capable of generating the required optical signals is able to communicate with the docking station. Electrical compatibility via an electrical connector is no longer a necessity. The docking station itself can be made configurable via EPROM for a particular manufacture's portable information handling system as an alternative, but in either case the interface is far easier to deal with than the typical electrical connection means. The need for direct physical contact between the portable information handling system and the docking station is not necessary, but can be eliminated or maintained as desired.

Figure 1:
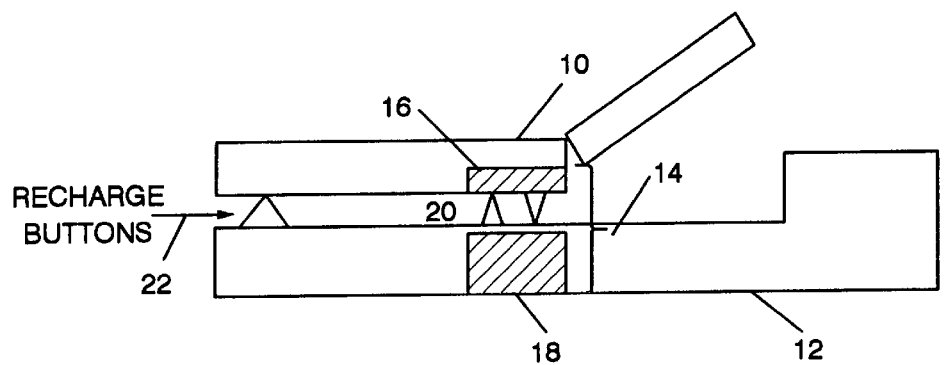
FIG. 1 is a block diagram of a portable information handling system connected to a docking station by a vertical lite link.

The six attached drawings show the invention in more detail. FIG. 1 shows a portable information handling system such as a laptop personal computer 10 sitting on top of an optical docking station 12. The laptop personal computer 10 is optically linked to the optical docking station 12 by an optical connection means 14 known as the "lite link." The optical connection means 14 has two separate components that are not mechanically connected. The laptop component 16 is installed in the laptop personal computer 10. The docking station component 18 is a part of the optical docking station 12. FIG. 1 shows light 20 flowing in a vertical direction between the laptop component 16 and the docking station component 18. For this reason, the optical connection means 14 arrangement shown in FIG. 1 is known as the "vertical lite link."

The optical connection means 14 is equipped to generate and receive point-to-point directed beam, in air, optical link. The optical link runs at approximately 275 Mbits/sec. A microprocessor (not shown) in the docking station component 18 can provide a bus emulator or bus extension capability. The microprocessor then can receive information and direct it to the appropriate peripheral devices (not shown). The individual peripheral control hardware is duplicated within the docking station which is a cheaper solution than optically moving the data contained in the 240-pin interface at full band width.

Most portable personal computers are relatively power hungry and require daily recharge if the hard drive is used often. Although the electrical connection between the docking station 12 and the laptop personal computer 10 has been removed in favor of the optical connection means 14, other arrangements can be made to electrically charge up the laptop personal computer 10 while it is attached to the docking station 12. As shown in FIG. 1, an adjustable contact button 22 can be used for recharging the laptop personal computer 10 and can be built into the docking station 12 and mated to the laptop personal computer 10. This type of electrical interface would not be as difficult to handle as a large multi-pin connector.

Eliminating the large connector will now permit different styling of the casing of the laptop personal computer 10 and down-sizing of the laptop personal computer 10. As an alternative embodiment, the optical connection means 14 can be coupled to a fiber (not shown) for nonaligned linking of the docking station 12 and the laptop personal computer 10. A fiber connection would be particularly useful, for example, to two users on an airplane.

Provisions have been identified for alignment verification between the laptop personal computer 10 and the optical docking station 12 so that the user can be assured of good optical connectivity between the components 16 and 18 of the optical connection means 14. Alignment verification is accomplished as a by-product of the hardware involved in the optical connection means 14.

Figure 2:
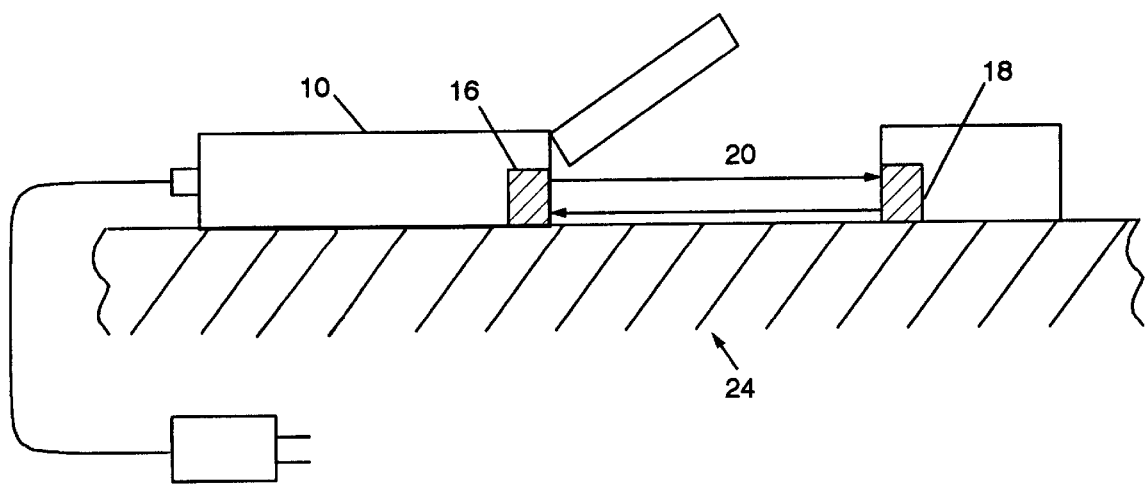
FIG. 2 is a block diagram of a portable information handling system connected to a docking station by a horizontal lite link.

FIG. 2 shows the "horizontal lite link" configuration. In FIG. 2, a laptop personal computer 10, rests on a desktop 24. Again, the optical connection means 14 has two components. The laptop component 16 is horizontally parallel to the docking component 18 that is housed within a docking station 26. Also shown in FIG. 2 is the possibility of electrically recharging the laptop personal computer using a cable 28. FIG. 2 shows light 20 flowing in a horizontal direction between the laptop component 16 and the docking station component 18. For this reason, the optical connection means 14 arrangement shown in FIG. 2 is known as the horizontal lite link.

Figure 3:
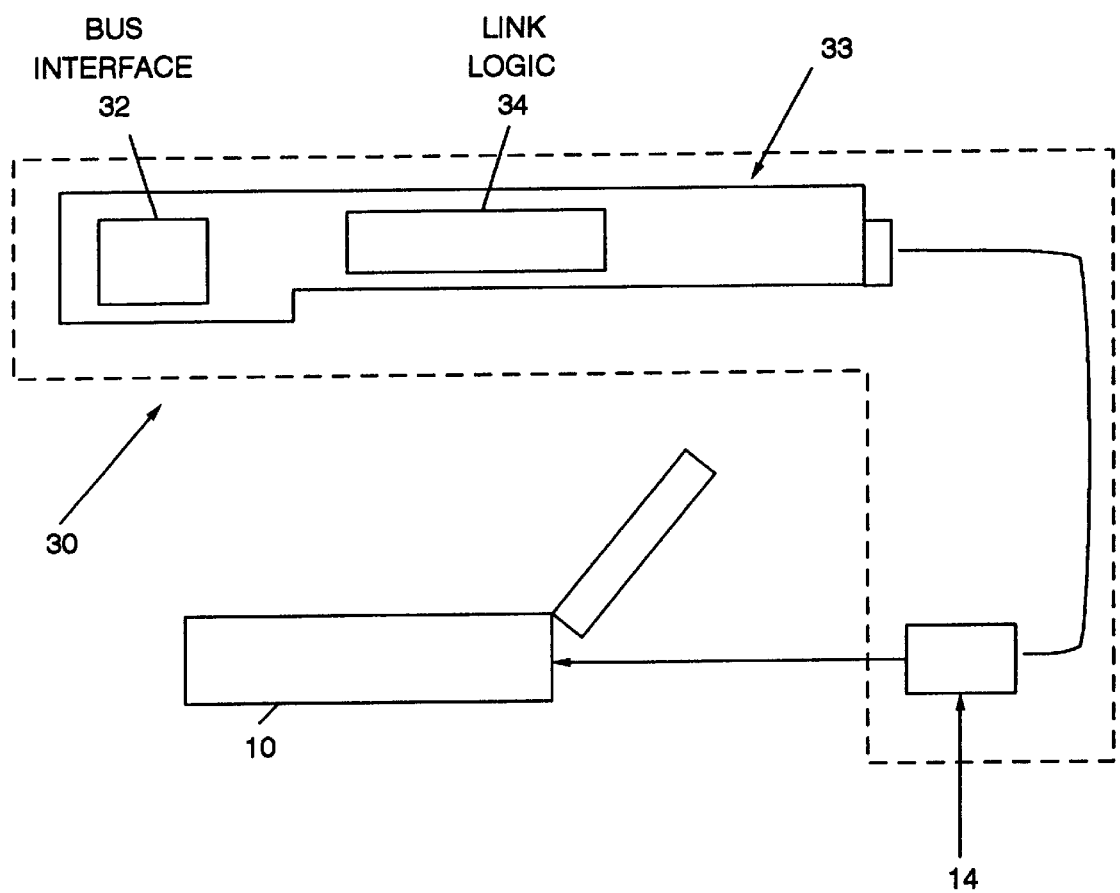
FIG. 3 is a block diagram of a portable information handling system with a conventional electrical connector that has been converted for use as an optical docking station (not shown) by inserting a feature card that provides an optical interface.

As shown in FIG. 3, the docking function can also be provided by utilizing an existing desktop personal computer 30 interfaced to a laptop personal computer 10 via the optical connection means 14. The desktop personal computer 30 can be made to slave to the laptop personal computer 10 or merely communicate to the laptop personal computer 10 for file transfer or external linking via modem. The approach shown in FIG. 3 can be implemented as a feature card 33 that plugs into a card slot on the desktop personal computer 30 and links to the optical connection means 14. The desktop personal computer 30 has a bus interface 32 and link logic 34 to accommodate the optical connection means 14 to the laptop personal computer 10.

Figure 4:
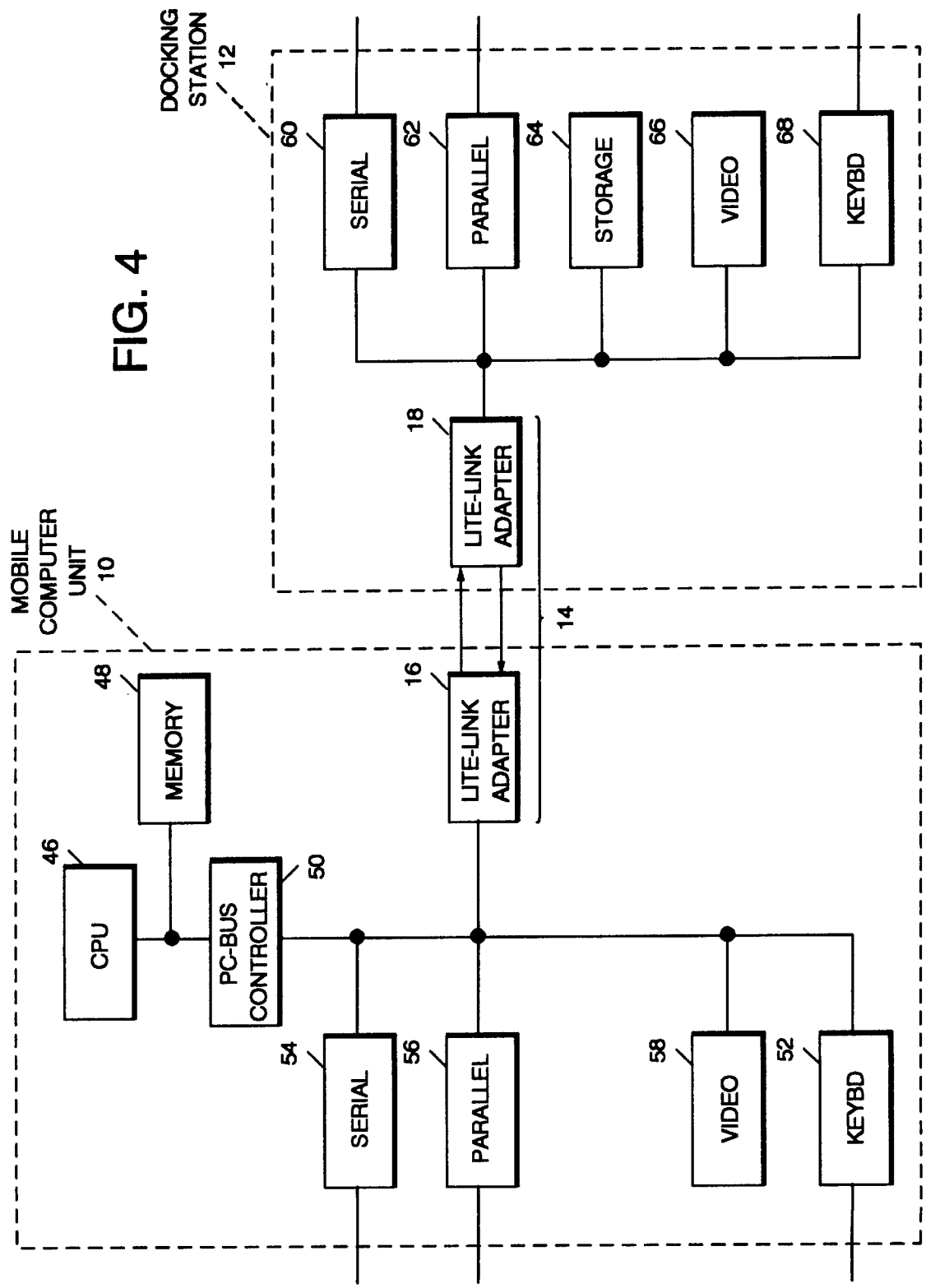
FIG. 4 is a block diagram of a portable information handling system with a conventional electrical connector that has been converted for use with the optical docking station shown.

FIG. 4 is a schematic of a portable information handling system such as a laptop personal computer 10 and an optical docking station 12 connected by an optical connection means 14. The laptop personal computer 10 has a CPU 46, a memory storage system 48, a bus 50 and an input device 52 such as a keyboard. The laptop personal computer may optionally include serial connection means 54 and parallel connection means 56, or a display means 58 such as a computer screen. The optical docking station 12 may have a memory storage system 64, a display graphic means 66, or an input device 68 such as a keyboard. The optical connection means 14 has a laptop component 16 within the laptop 10 and a docking station component 18 housed within the docking station 12.

Figure 5:
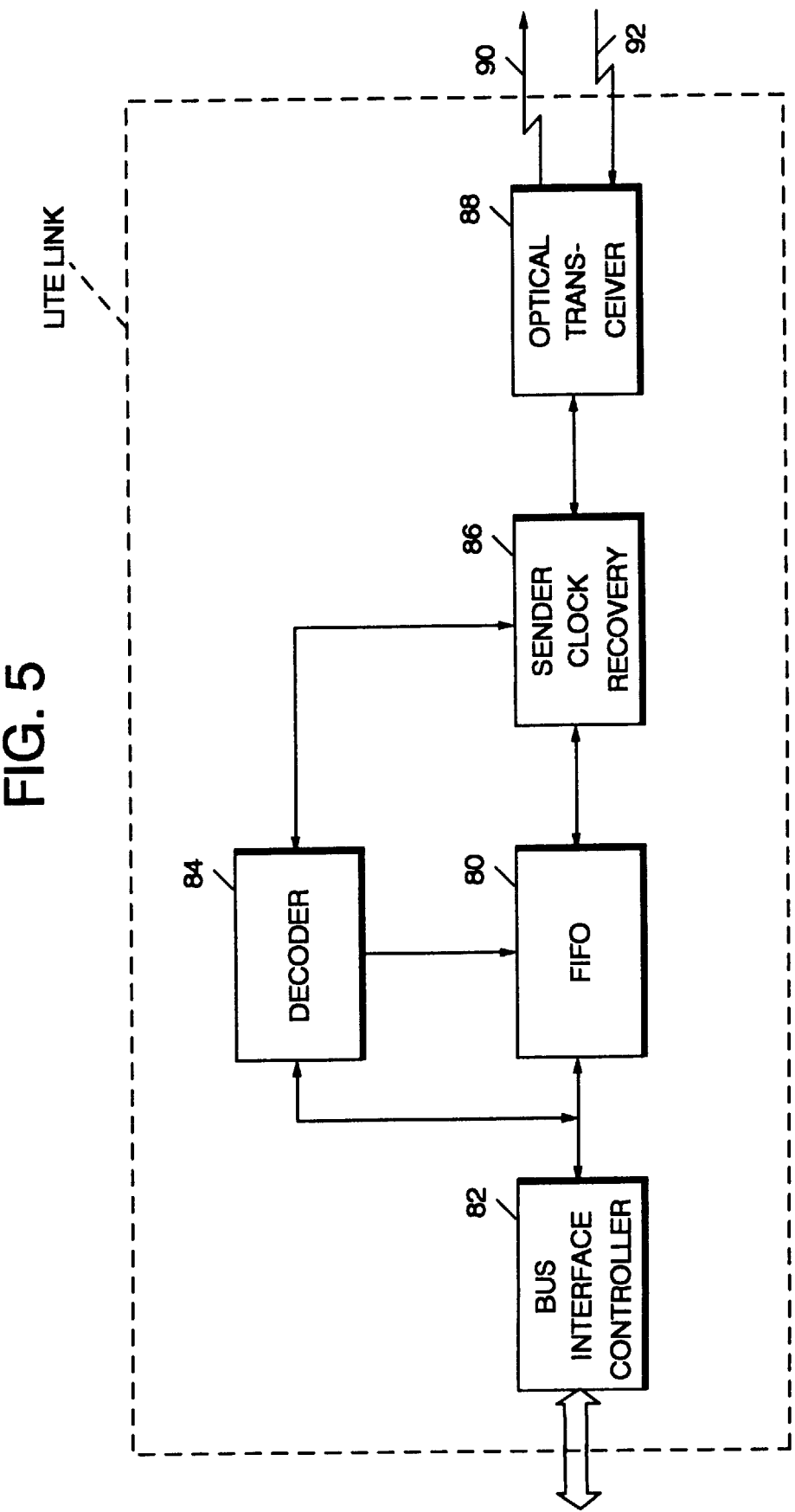
FIG. 5 is a schematic diagram of the lite link adapter that converts portable information handling systems having a conventional electrical connector for use with an optical docking station.
Figure 6:
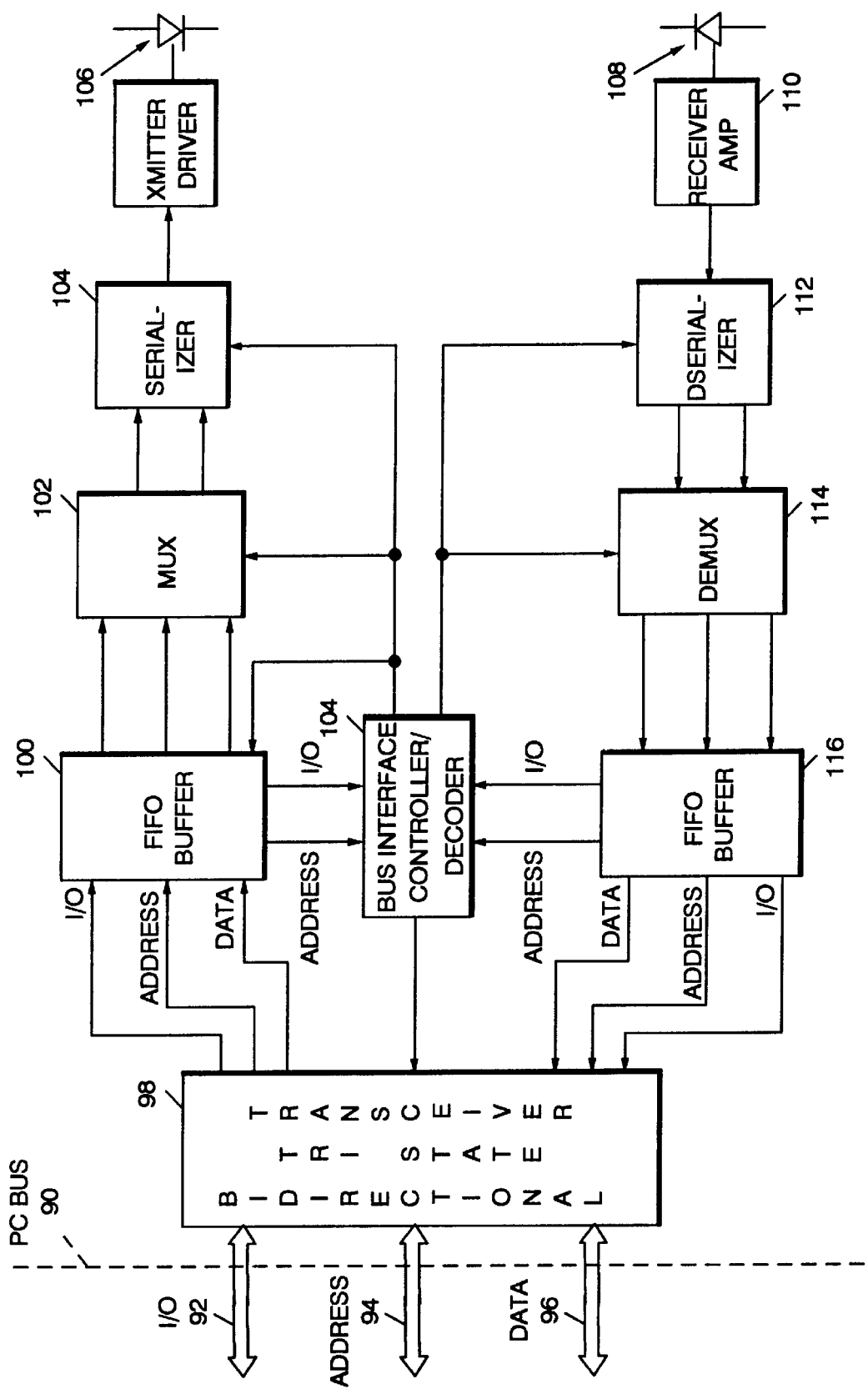
FIG. 6 is a more detailed schematic diagram of the optical docking station of the present invention.

FIGS. 5 and 6 are two different versions of the same diagram with different degrees of detail. Both show the use of a FIFO 80 (first in first out) to simplify interface timing between the optical docking station 12 and the laptop personal computer 10. The FIFO 80 is key to FIG. 5 because the FIFO 80 permits a degree of miss-match between the speeds of the dock 12 versus the host laptop personal computer 10 linked to the dock 12. (See page 7, lines 5 through 9.) The modulated light passing between devices carries not only the data that is to be transferred between the devices but the rate of change in the modulation contains information about the clock contained on each side of the link. The deserializer 86 contains components that extract the clock from the incoming data. This is conventional in fiber optic communication.

The FIFO 80 provides a storage area for data that would otherwise be lost due to clock rate disparities. This feature broadens the range of acceptable clock discrepancies between the host laptop personal computer 10 and the dock 12 thereby permitting cross manufacture interconnect. The FIFO 80 is controlled by the microprocessor (shown as 46 in FIG. 4) on the laptop personal computer 10 or another link support processor (not shown), such as a bus mastering device, that is slaved to the laptop personal computer 10. With the FIFO 80, loaded data can be sent to the serializer 86. Here a phase lock loop will generate a synchronous high speed clock that will pace data out of the FIFO 80 to the optical transceiver 88. The optical transceiver 88 uses a high speed LED and a ball lens to create a parallel modulated optical beam 90. The receive function is merely the opposite process. The serial optical beam is collected by another ball lens and coupled into a pin diode within the optical transceiver 88 that is responsive to the incoming light 92. The data is identified for byte sync so that the proper bits are read in the correct order. Byte sync refers to the ability to recognize where a byte (8 bits of digital information) begins in the serial data stream. It also implies that information can be distinguished as to whether it is address information, data information, or control information. Each byte or piece of information has an identity. As shown in FIG. 6, I/O, address and data information enter the multiplexer 102 where they are combined, serialized and transmitted. The structure below is the reverse operation. But the key to this function working is the fact that the information can be separated and reconstructed to become I/O information, address, and data again. This requires byte sync and byte identification to demultiplex the information and the data is deserialized at 86 and supplied to the FIFO 80. The data resides in the FIFO 80 until it can be brought into the portable personal computer's 10 bus via the bus interface controller 82. Also shown in FIG. 5 are the decoder 84 and the serializer/deserializer clock recovery 86 that assist in converting optical information to and from information that can be read by the laptop personal computer 10.

FIG. 6 is a more detailed version of FIG. 5. Whereas FIG. 5 shows functional blocks that can be hardware or software, FIG. 6 shows a detailed hardware implementation of the invention. From FIG. 6 it can be seen that the PC bus 90 carries input/output 92, address locations 94, and data 96 to and from the transceiver 98. Information coming from the PC bus 90 passes through the transceiver 98 and then goes to the FIFO buffer 100. The FIFO buffer 100 transmits data 96 to the multiplexer 102. The FIFO buffer 100 transmits address 94 and input/output 92 to the bus interface controller/decoder 104. The bus interface controller/decoder directs information then to the multiplexer 102, to the serializer 104, or back to the FIFO buffer 100. The multiplexer 102 directs information to the serializer 104. The serializer 104 then sends information to the transmitter driver 106 which then goes out as light 106.

Incoming light 108 enters a receiver amplifier 110 and is deserialized in the deserializer 112. The deserializer 112 then sends information to the demultiplexer 114. Information goes from the demultiplexer 114 to the FIFO buffer 116 for distribution either to the bus interface controller/decoder 104 or to the transceiver 98. The bus interface controller/decoder 104 sends information to the deserializer 112, the demultiplexer 114, or to the transceiver 98. The transceiver then sends received information to the PC bus 90.

It should be noted that FIG. 6 could be implemented as software, rather than hardware, however, the performance would be slower.

From the foregoing description it should be apparent that the present invention is a system in the broadest sense with special enhancements that can be adapted to the required use. The invention can be fully implemented in hardware or software, with performance trade-offs. The architecture shown permits clock variation between host and dock devices. Connection of devices made by different manufacturers thus is easily achievable and can be personalized to meet specific requirements. Moreover, the system of this invention is secure since it is line of sight only. The serial data can be encoded to avoid not generating enough edges for clock recovery. The encoding scheme can be customized to provide additional data security if desired.

The optical docking station of the invention has several advantages. First, if a microprocessor is housed within the docking station, there is full bus extension to all peripherals. Secondly, the optical docking station can communicate with any device that conforms to the optical link requirements. Thirdly, the microprocessor housed within the docking station opens the opportunity for parallel processing in the docking station while the information handling system addresses other tasks. Fourthly, the case housing the portable information handling system no longer will have to accommodate a large multi-pin connector, thus rounded corners on the case will be possible.

The foregoing has described certain features and advantages of the invention. Those skilled in the art will know that certain modifications and adaptions can be made without departing from the spirit and scope of the invention. Therefore, the invention is limited only by the following claims and their equivalents.

What is claimed is:

1. An optical docking station comprising:

a docking station for holding an information handling system; and means for optically connecting, without mechanically connecting, the information handling system to the optical docking station and to one or more peripheral devices, the optical connection means comprising:

a laptop component housed within the portable information handling system;

a docking station component housed with the optical docking station; wherein the laptop component and the docking station component send and receive information optically to each other;

a transceiver that sends information to and receives information from a bus housed within the information handling system;

a FIFO butter than sends information to and receives information from the transceiver;

a multiplexer that receives information from the FIFO buffer;

a demultiplexer that sends information to the FIFO buffer;

a serializer that receives information from the multiplexer;

a deserializer that sends information to the demultiplexer;

a transmitter driver that receives information from the serializer and transmits light out;

a receiver amplifier that receives light and transmits the light to the deserializer; and a bus interface controller/decoder that receives information from the FIFO buffer and transmits the information as appropriate to the transceiver, the FIFO buffer, the multiplexer, the demultiplexer, the serializer, and/or the deserializer.

2. The optical docking station of claim 1 further comprising:

a recharge button for recharging an information handling system housed in the optical docking station.

3. The optical docking station of claim 1 further comprising means for executing independent remote jobs.

4. The optical docking station of claim 1, further comprising:

means for extending a system bus of the information handling system into the optical docking station.

5. The optical docking station of claim 1, wherein the optical connection means is hardware.

6. The optical docking station of claim 1, wherein the optical connection means is software.

7. The information handling system of claim 8, wherein the optical connection means is hardware.

8. An information handling system comprising:

a central processing unit;

a memory subsystem;

a PC bus controller; and means for optically connecting the information handling system to an optical docking station, the optical connection means comprising:

a laptop component housed within the information handling system;

a docking station component housed within the optical docking station; wherein the laptop component and the docking station component send and receive information optically to each other a transceiver that sends information to and receives information from a bus located within the information handling system;

a FIFO buffer that sends information to and receives information from the transceiver;

a multiplexer that receives information from the FIFO buffer;

a demultiplexer that sends information to the FIFO buffer;

a serializer that receives information from the multiplexer;

a deserializer that sends information to the demultiplexer;

a transmitter driver that receives information from the serializer and transmits the light out;

a receiver amplifier that receives light and transmits the light to the deserializer; and a bus interface controller/decoder that receives information from the FIFO buffer and transmits the information as appropriate to the transceiver, the FIFO buffer, the multiplexer, the demultiplexer, the serializer, and the deserializer.

9. The information handling system of claim 8, wherein the optical connection means is software.

* * * * *